US012159542B2

(12) United States Patent
Sakurada et al.

(10) Patent No.: US 12,159,542 B2
(45) Date of Patent: Dec. 3, 2024

(54) CONTROL DEVICE, SYSTEM, PROGRAM, CONTROL INSTRUMENT, FLYING OBJECT, SENSOR, AND METHOD OF OPERATING SYSTEM

(71) Applicant: Toyota Jidosha Kabushiki Kaisha, Toyota (JP)

(72) Inventors: Shin Sakurada, Toyota (JP); Kazuya Nishimura, Anjo (JP); Soutaro Kaneko, Nagoya (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 175 days.

(21) Appl. No.: 17/395,939

(22) Filed: Aug. 6, 2021

(65) Prior Publication Data

US 2022/0130259 A1   Apr. 28, 2022

(30) Foreign Application Priority Data

Oct. 22, 2020  (JP) ................................ 2020-177554

(51) Int. Cl.
| | |
|---|---|
| G08G 5/00 | (2006.01) |
| B64C 39/02 | (2023.01) |
| B64U 101/60 | (2023.01) |
| B64U 101/64 | (2023.01) |
| B65F 3/00 | (2006.01) |
| G05D 1/00 | (2024.01) |

(52) U.S. Cl.
CPC ............. *G08G 5/006* (2013.01); *B65F 3/00* (2013.01); *G05D 1/0022* (2013.01); *G08G 5/003* (2013.01); *B64C 39/02* (2013.01); *B64U 2101/60* (2023.01); *B64U 2101/64* (2023.01); *B64U 2201/10* (2023.01)

(58) Field of Classification Search
CPC . B64C 39/02; B64C 39/024; B60R 2300/202; B60R 2300/802; B65F 3/00; B64U 2101/00; B64U 2101/60; B64U 2101/64; B64U 2101/67; B64U 2201/00; B64U 2201/10; B64U 2201/20; G05D 1/0011; G05D 1/0022; G05D 1/0033; G05D 1/102; G05D 1/106; G08G 5/003; G08G 5/0047; G08G 5/006; G08G 5/0069
USPC ...................... 701/2, 3, 4, 11, 23, 25, 26, 28
See application file for complete search history.

(56) References Cited

U.S. PATENT DOCUMENTS

| | | | |
|---|---|---|---|
| 2010/0165091 A1 | 7/2010 | Teranishi et al. | |
| 2017/0166299 A1* | 6/2017 | Fujimura | ............... B64C 39/024 |
| 2017/0267347 A1* | 9/2017 | Rinaldi | .................. B64C 39/024 |
| 2018/0025649 A1* | 1/2018 | Contreras | ............ G08G 5/0069 |
| | | | 701/3 |

(Continued)

FOREIGN PATENT DOCUMENTS

| | | |
|---|---|---|
| JP | 2010157119 A | 7/2010 |
| JP | 2018-112029 A | 7/2018 |

*Primary Examiner* — Adam D Tissot
*Assistant Examiner* — Aaron K McCullers
(74) *Attorney, Agent, or Firm* — Dinsmore & Shohl LLP

(57) ABSTRACT

A control device includes: a communication unit; and a control unit that transmits and receives information via the communication unit. When a flying object flies around a complex housing, the control unit transmits, to the flying object, information on a flight route in which a transported object of the flying object enters a blind spot from inside of the complex housing based on information on the complex housing.

18 Claims, 12 Drawing Sheets

(56) References Cited

U.S. PATENT DOCUMENTS

2018/0322794 A1\* 11/2018 Beaurepaire ........... G05D 1/102
2020/0061839 A1\* 2/2020 Deyle .................. G06Q 10/087

\* cited by examiner

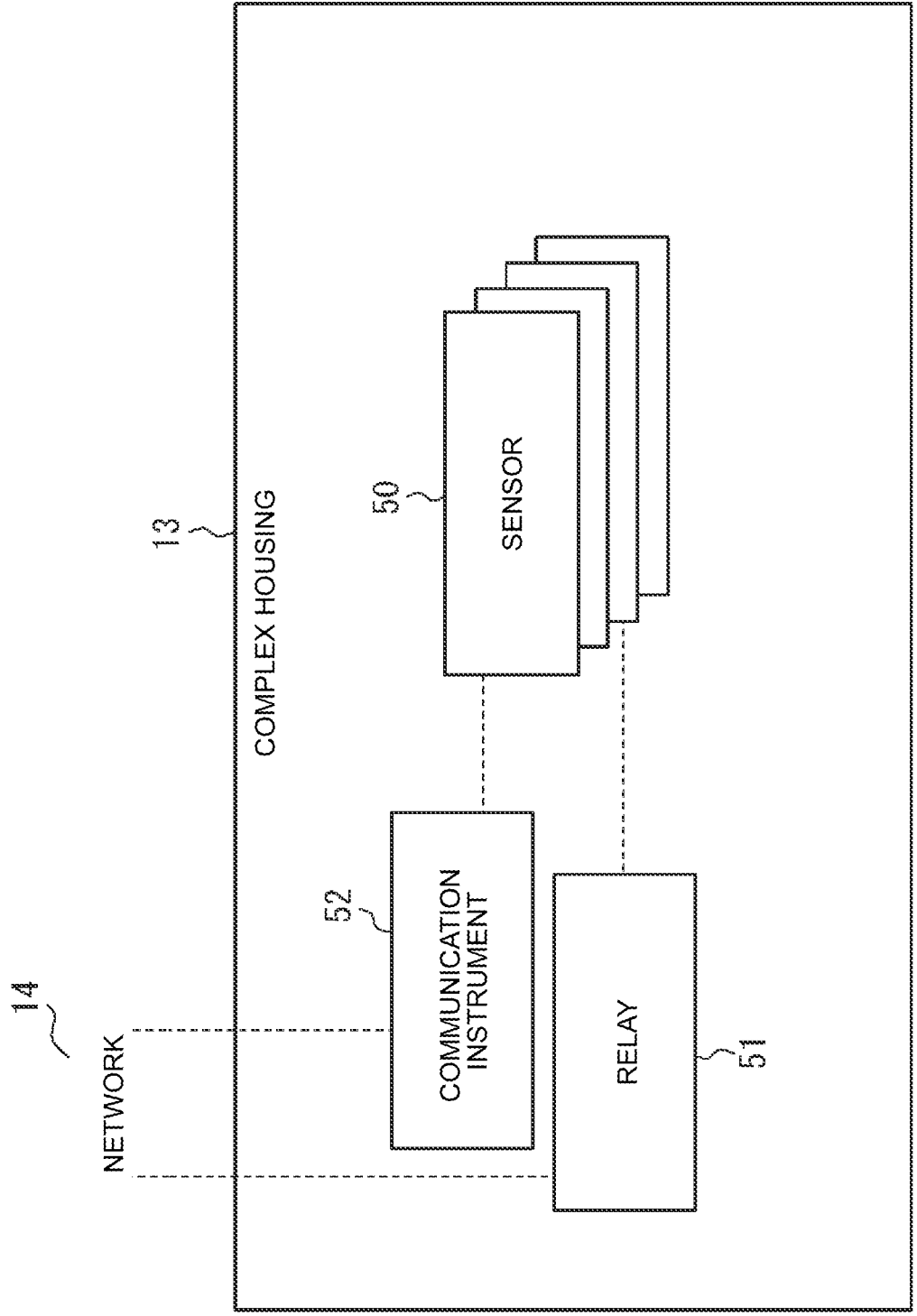

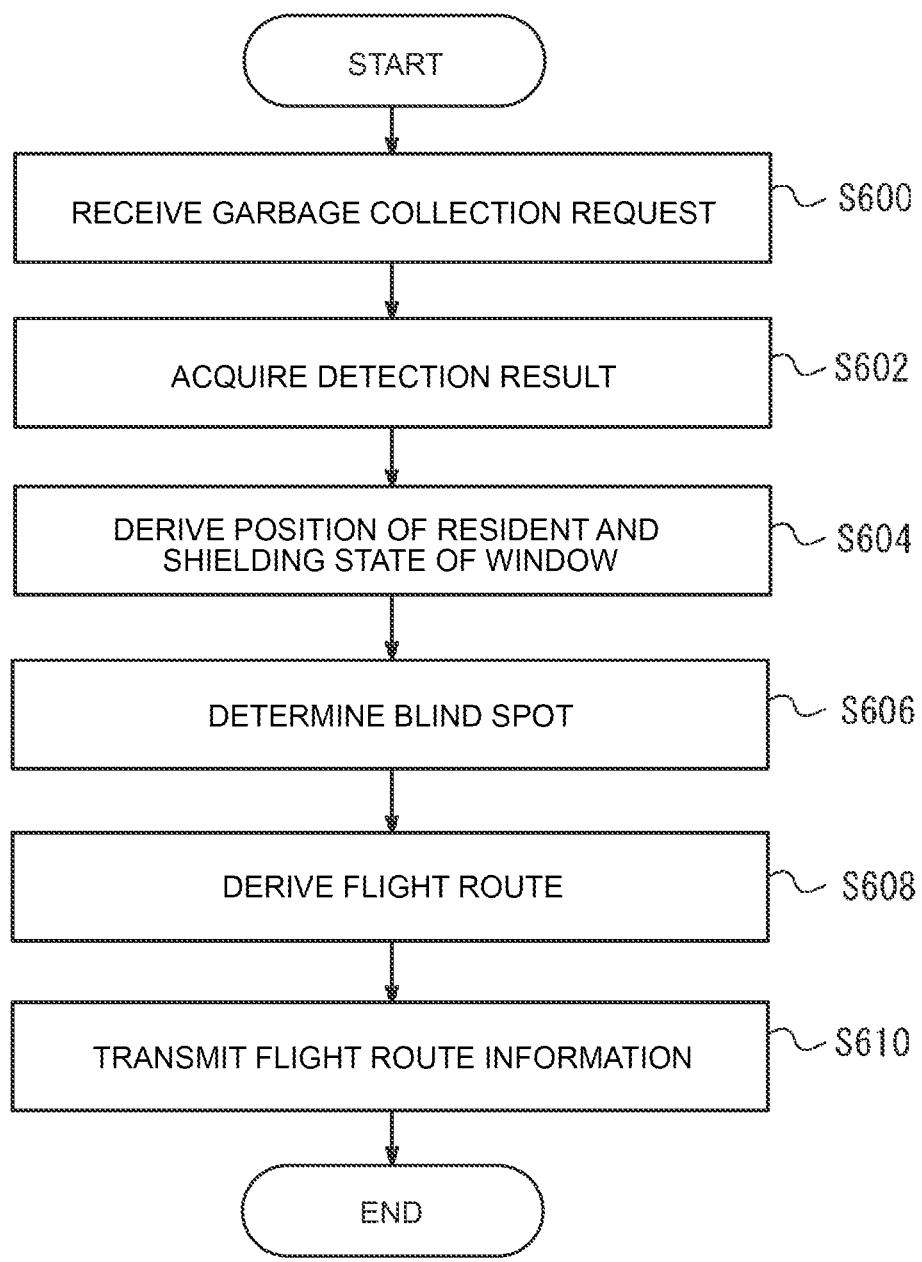

CONTROL DEVICE, SYSTEM, PROGRAM, CONTROL INSTRUMENT, FLYING OBJECT, SENSOR, AND METHOD OF OPERATING SYSTEM

CROSS-REFERENCE TO RELATED APPLICATION

This application claims priority to Japanese Patent Application No. 2020-177554 filed on Oct. 22, 2020, incorporated herein by reference in its entirety.

BACKGROUND

1. Technical Field

The present disclosure relates to a control device, a system, a program, a control instrument, a flying object, a sensor and a method of operating the system.

2. Description of Related Art

Japanese Unexamined Patent Application Publication No. 2018-112029 (JP 2018-112029 A) discloses a drone that arrives and departs from a port provided on a balcony of a complex housing such as an apartment housing.

SUMMARY

There is a demand for improvement of the comfort of residents when a flying object such as a drone flies around the complex housing.

The present disclosure discloses a control device and the like that enable improvement of the comfort of the residents when the flying object flies around the complex housing.

A control device according to the present disclosure includes: a communication unit; and a control unit that transmits and receives information via the communication unit. When a flying object flies around a complex housing, the control unit transmits, to the flying object, information on a flight route in which a transported object of the flying object enters a blind spot from inside of the complex housing based on information on the complex housing.

A method of operating a system according to the present disclosure is a method of operating a system including a flying object and a control device that transmits and receives information to and from the flying object. When the flying object flies around a complex housing, the control device transmits, to the flying object, information on a flight route in which a transported object of the flying object enters a blind spot from inside of the complex housing based on information on the complex housing.

According to the control device and the like of the present disclosure, it is possible to improve the comfort of the residents when the flying object flies around the complex housing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a diagram showing a configuration of sensors in a complex housing;

FIG. 6 is a flowchart diagram showing an operation of the control device;

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
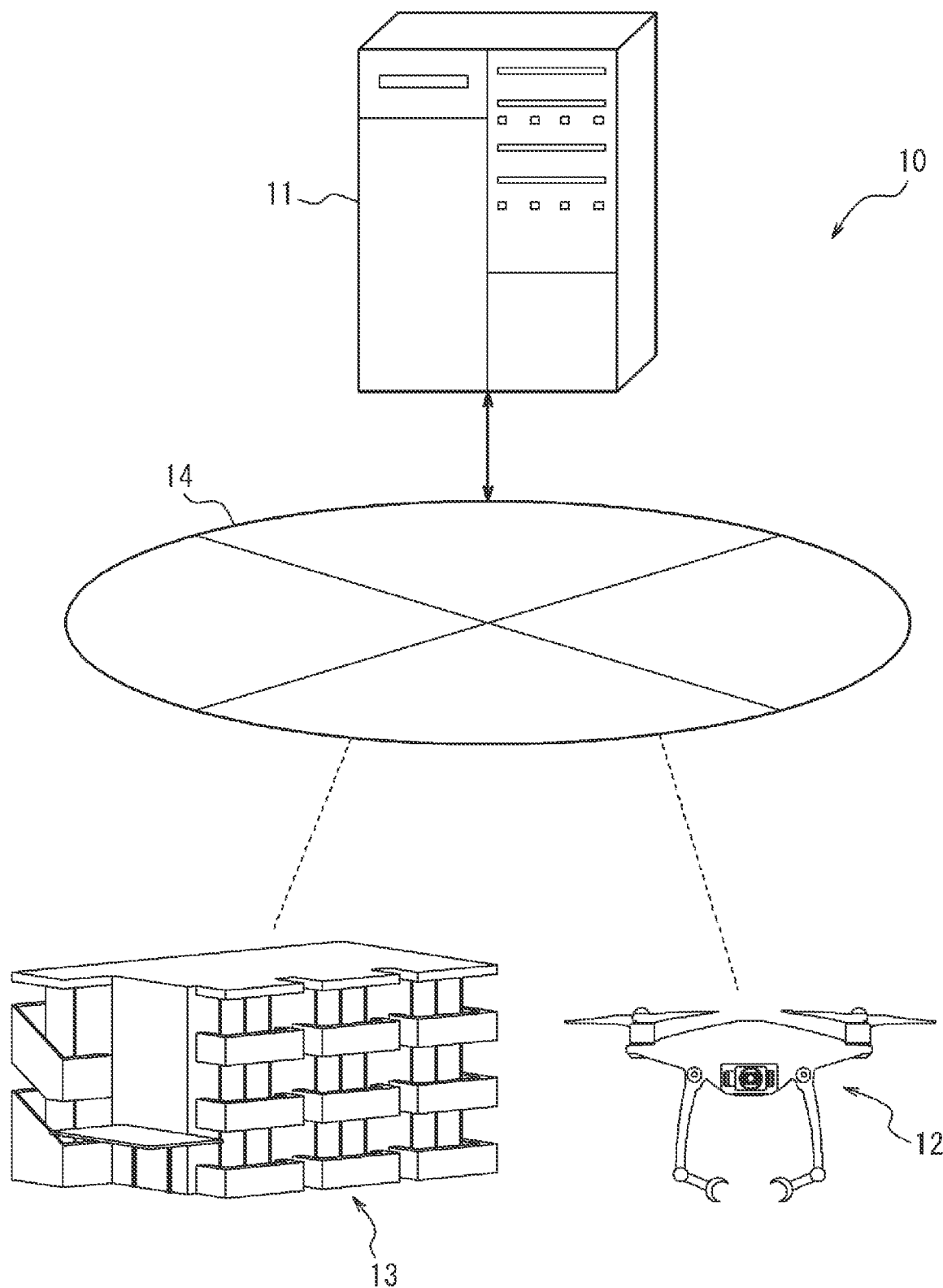
FIG. 1 is a diagram showing a configuration of a system according to an embodiment of the present disclosure.

FIG. 1 is a diagram showing a configuration of a system according to the embodiment. A system 10 includes at least one control device 11 and at least one flying object 12. The control device 11 is connected to the flying object 12 via a network 14 so as to be able to perform information communication with each other. Further, sensors provided in various places of a complex housing 13 are connected to the network 14. The control device 11 receives information indicating various detection results detected by the sensors via the network 14. The control device 11 is installed in a facility such as a data center. The control device 11 is, for example, a computer such as a server belonging to a cloud computing system or other computing systems. The flying object 12 is, for example, an unmanned aerial vehicle (UAV) such as an autonomous flight drone. The flying object 12 is a drone that flies in the air by rotating a plurality of rotor blades using an electric power of a mounted battery and generating lift. The flying object 12 flies by autopilot in the present embodiment. However, the flying object 12 may fly by remote control. The flying object 12 includes a holding mechanism for flying while holding a transported object. The network 14 includes the Internet, at least one wide area network (WAN), at least one metropolitan area network (MAN), or any combination thereof. The network 14 may include at least one wireless network, at least one optical network, or any combination thereof. The wireless network is, for example, an ad hoc network, a cellular network, a wireless local area network (LAN), a satellite communication network, or a terrestrial microwave network. The complex housing 13 is, for example, an apartment housing in which a plurality of dwelling units is accommodated.

Figure 2:
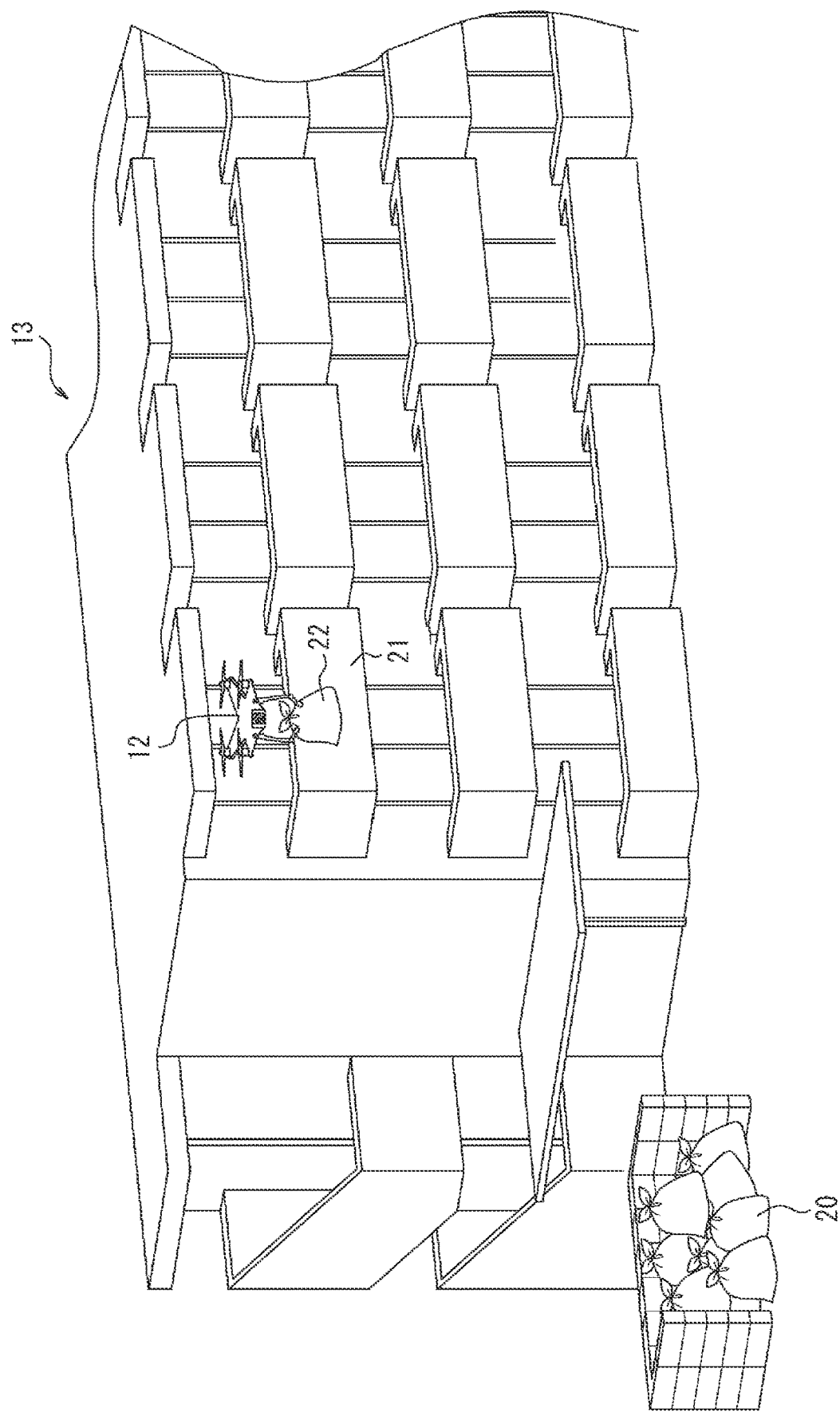
FIG. 2 is a diagram showing an example of an operation of the system according to the embodiment.

FIG. 2 shows an outline of the present embodiment. The flying object 12 holds and transports a transported object when flying around the complex housing 13. The transported object held and transported by the flying object 12 is a waste (garbage bag) 22 here. The control device 11 transmits, to the flying object 12, flight route information such that the transported object on the flying object 12, that is, the garbage bag 22 enters a blind spot from the inside of the complex housing 13, based on information on the complex housing 13. When the flying object 12 collects the garbage bag 22 from one balcony 21 and transports the garbage bag 22 to an accumulation area 20 of the garbage, at least the garbage bag 22 passes through the blind spot from the inside of the complex housing 13. Therefore, it is possible to reduce a probability that the garbage bag 22 held by the flying object 12 obstructs the field of view of the resident inside the complex housing 13. Therefore, it is possible to improve the comfort of the residents.

Figure 3:
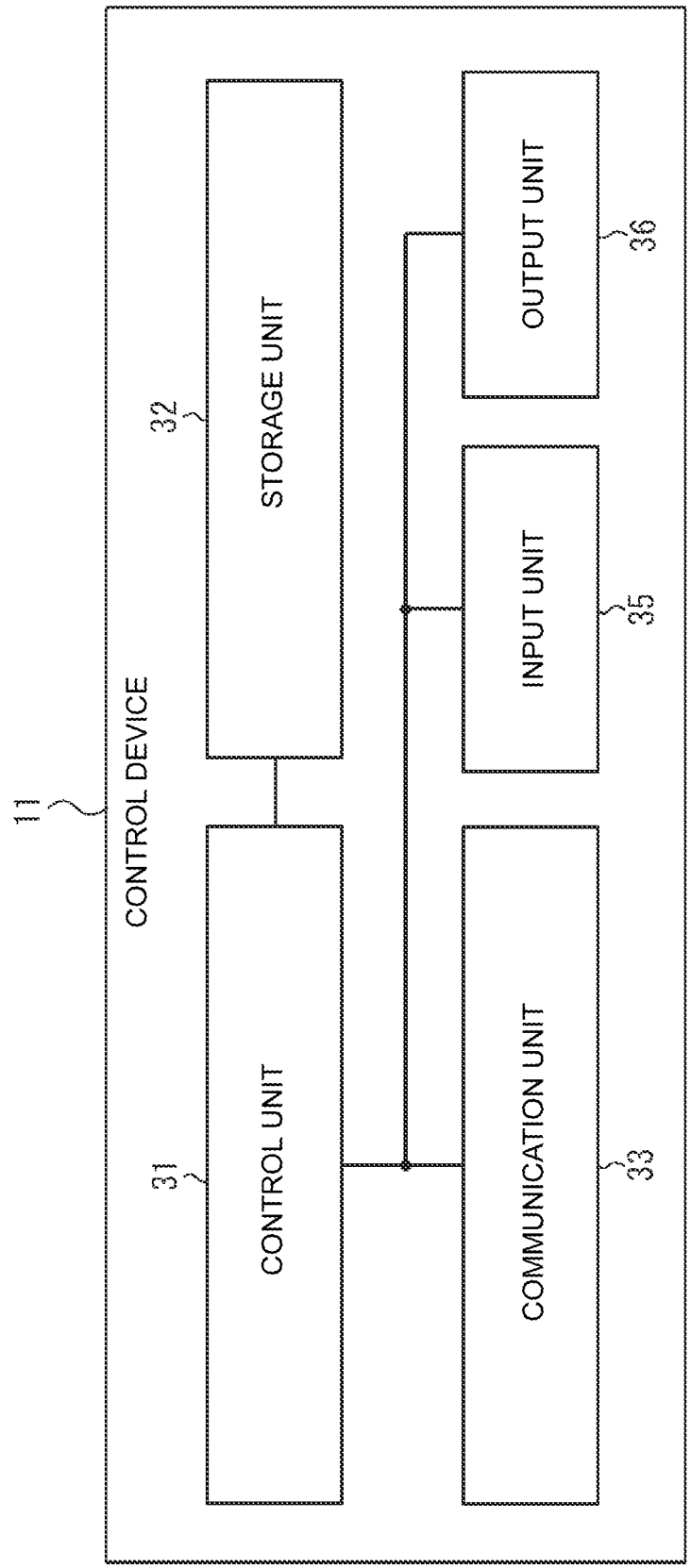
FIG. 3 is a diagram showing a configuration of a control device.

FIG. 3 shows a configuration example of the control device 11. The control device 11 includes a control unit 31, a storage unit 32, a communication unit 33, an input unit 35, and an output unit 36. The control device 11 is, for example, a server computer that functions as a server that implements various functions. The control device 11 may be one or more server computers that are connected to each other so as to be able to perform information communication with each other and operate in cooperation with each other.

The control unit 31 includes one or more processors, one or more dedicated circuits, or a combination thereof. The processor is a general-purpose processor such as a central processing unit (CPU) or a dedicated processor specialized for a specific process such as a graphics processing unit (GPU). The dedicated circuit is, for example, a field-programmable gate array (FPGA) or an application-specific integrated circuit (ASIC). The control unit 31 executes information processing related to the operation of the control device 11 while controlling each unit of the control device 11.

The storage unit 32 includes, for example, one or more semiconductor memories functioning as a main storage device, an auxiliary storage device, or a cache memory, one or more magnetic memories, one or more optical memories, or a combination of at least two of them. The semiconductor memory is, for example, a random access memory (RAM) or a read-only memory (ROM). The RAM is, for example, a static RAM (SRAM) or a dynamic RAM (DRAM). The ROM is, for example, an electrically erasable programmable read only memory (EEPROM). The storage unit 32 stores the information used for the operation of the control device 11 and the information obtained through the operation of the control device 11.

The communication unit 33 includes one or more communication interfaces. The communication interface is, for example, a LAN interface. The communication unit 33 receives information used for the operation of the control device 11, and transmits information obtained through the operation of the control device 11. The control device 11 is connected to the network 14 via the communication unit 33, and performs communication with other devices via the network 14.

The input unit 35 includes one or more input interfaces. The input interface is, for example, a physical key, a capacitive key, a pointing device, a touch screen integrated with a display, or a microphone that receives voice input. The input interface may further include a camera that captures images or imports image codes, or an integral circuit (IC) card reader. The input unit 35 receives an operation for inputting the information used for the operation of the control device 11, and transmits the input information to the control unit 31.

The output unit 36 includes one or more output interfaces. The output interface is, for example, a display or a speaker. The display is, for example, a liquid crystal display (LCD) or an organic electroluminescence (EL) display. The output unit 36 outputs the data obtained through the operation of the control device 11.

The function of the control device 11 is realized by executing a control program using the processor included in the control unit 31. The control program is a program for causing a computer to execute a process of a step included in the operation of the control device 11 such that the computer can realize a function corresponding to the process of the step. That is, the control program is a program for causing the computer to function as the control device 11. A part or all of the functions of the control device 11 may be realized by a dedicated circuit included in the control unit 31.

In the present embodiment, the storage unit 32 stores the information on the complex housing 13. The information on the complex housing 13 includes information such as the position on the map of the complex housing 13, the dimensions and shape of the building frame, the layout, dimensions, and shape of the internal structure, the floor plan of each dwelling unit, facilities in each dwelling unit, etc. Specifically, the information on the complex housing 13 includes the position, dimensions and shape of the balcony provided in each dwelling unit of the complex housing 13, the position, dimensions and shape of a handrail wall of the balcony, and the position, dimensions and shape of windows provided in each dwelling unit. The windows are, for example, waist high windows, sweep windows leading to balconies, and other windows that allow a view of the outdoors. Further, the information on the complex housing 13 includes information on types of sash and glass in each window. Further, the information on the complex housing 13 includes the position of the standby place of the flying object 12 and the position of the accumulation area 20. In the case of a plurality of the complex housings 13, the storage unit 32 may store information on each of the complex housings 13. The control unit 31 executes information processing for each complex housing 13 to determine the blind spot from the inside of the complex housing 13 and obtain a flight route of the flying object 12 based on the information of the each complex housing 13.

Figure 4:
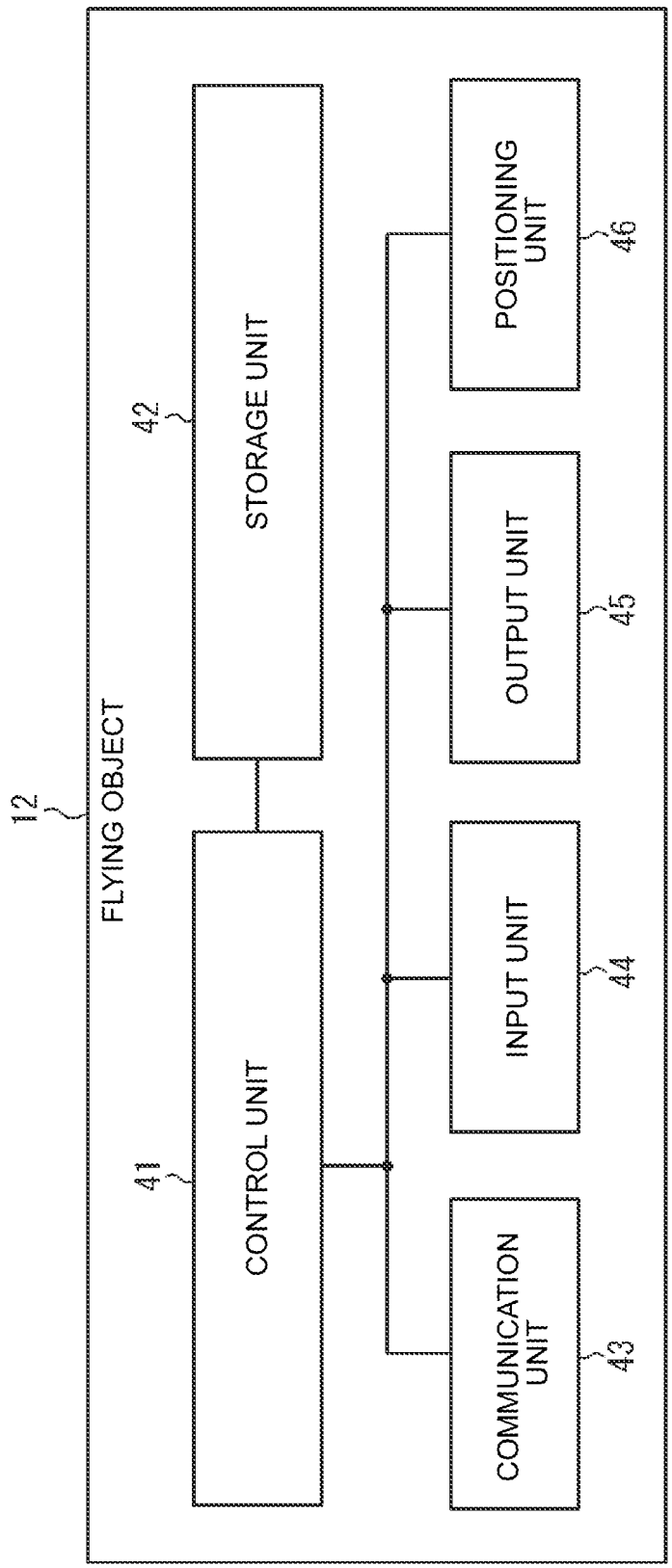
FIG. 4 is a diagram showing a configuration of a flying object.

FIG. 4 shows the configuration of the flying object 12. The flying object 12 includes a control unit 41, a storage unit 42, a communication unit 43, an input unit 44, an output unit 45, and a positioning unit 46.

The control unit 41 includes at least one processor, at least one programmable circuit, at least one dedicated circuit, or any combination thereof. The processor is a general-purpose processor such as a CPU or GPU, or a dedicated processor specialized for a specific process. The programmable circuit is, for example, an FPGA. The dedicated circuit is, for example, an ASIC. The control unit 41 executes processing related to the operation of the flying object 12 while controlling each unit of the flying object 12.

The storage unit 42 includes at least one semiconductor memory, at least one magnetic memory, at least one optical memory, or any combination thereof. The semiconductor memory is, for example, a RAM or a ROM. The RAM is, for example, an SRAM or a DRAM. The ROM is, for example, an EEPROM. The storage unit 42 functions as, for example, a main storage device, an auxiliary storage device, or a cache memory. The storage unit 42 stores data used for the operation of the flying object 12 and data obtained by the operation of the flying object 12.

The communication unit 43 includes at least one communication interface. The communication interface is, for example, an interface compatible with mobile communication standards such as the long term evolution (LTE), the fourth generation (4G), or the fifth generation (5G), an interface compatible with short-range wireless communication such as Bluetooth (registered trademark), or a LAN interface. The communication unit 43 receives the data used for the operation of the flying object 12, and transmits the data obtained through the operation of the flying object 12.

The input unit 44 includes at least one input interface. The input interface is, for example, a physical key, a capacitive key, a pointing device, a touch screen integrated with a display, a camera, or a microphone. The input unit 44 receives an operation of inputting data used for the operation of the flying object 12. The input unit 44 may be connected to the flying object 12 as an external input device instead of being provided in the flying object 12. As a connection method, for example, any method such as universal serial bus (USB), high definition multimedia interface (HDMI) (registered trademark), or Bluetooth (registered trademark) can be used.

The output unit 45 includes at least one output interface. The output interface is, for example, a display or a speaker. The display is, for example, a LCD or an organic EL display. The output unit 45 outputs the data obtained through the operation of the flying object 12. The output unit 45 may be connected to the flying object 12 as an external input device instead of being provided in the flying object 12. As a connection method, for example, any method such as USB, HDMI (registered trademark), or Bluetooth (registered trademark) can be used.

The positioning unit 46 includes at least one global navigation satellite system (GNSS) receiver. The GNSS is, for example, the global positioning system (GPS), the quasi-zenith satellite system (QZSS), the BeiDou navigation satellite system (BDS), the global navigation satellite system (GLONASS), or Galileo. The positioning unit 46 measures the position of the flying object 12.

The control unit 41, the storage unit 42, the communication unit 43, the input unit 44, the output unit 45, and the positioning unit 46 may be provided in the flying object 12 by being individually incorporated in the flying object 12, or may be provided in the flying object 12 together with a control instrument by being incorporated in at least one control instrument. The function of the control instrument is realized by executing the control program according to the present embodiment with the processor serving as the control unit 41. That is, the function of the control instrument is realized by software. The control program causes the computer to perform the operation of the control instrument such that the computer functions as the control instrument. That is, the computer functions as the control instrument by performing the operation of the control instrument according to the control program. A part or all of the functions of the control instrument may be realized by a programmable circuit or a dedicated circuit as the control unit 41. That is, a part or all of the functions of the control instrument may be realized by hardware.

FIG. 5 is a diagram showing an example of sensors provided in the complex housing 13. Sensors 50 are provided in various places in each dwelling unit of the complex housing 13. The sensors 50 are connected to a relay 51 such as a gateway provided at an arbitrary position in the complex housing 13 or a communication instrument 52 such as a smartphone equipped with a mobile communication module. The sensors 50 have a wired or wireless communication module connected to the relay 51 or the communication instrument 52, are connected to the network 14 via the relay 51 or the communication instrument 52, and transmit the detection results to the control device 11 via the network 14. The sensors 50 include, for example, an image sensor, a voice sensor, a temperature sensor, a sensor for detecting an open-closed state of a window sash, a curtain, a screen, a window shade, and other shielding means in the room. The sensors 50 are provided in the room of each dwelling unit. Further, the sensors 50 include a position sensor included in an instrument such as a wearable device worn by the resident and connected to the communication instrument 52 by short-range wireless communication. Alternatively, the sensors 50 may include a position sensor integrally configured with the communication instrument 52. The control unit 31 of the control device 11 detects the position of the resident in the room or the open-closed state of the window, the curtain or other shielding means based on the detection results of the sensors 50.

The configuration of a system 10 according to the present embodiment will be described with reference to FIG. 6. FIG. 6 is a flowchart diagram showing a procedure executed by the control unit 41 of the control device 11.

The procedure of FIG. 6 is executed, for example, when the resident of the complex housing 13 requests collection of the garbage bag 22. In step S600, the control unit 31 of the control device 11 receives a garbage collection request via the communication unit 33. The collection request is transmitted from an information processing device having a communication function, such as a smartphone or personal computer (PC) of the resident. The resident places the garbage bag 22 at a collection position on the balcony of the dwelling unit of the resident, operates the information processing device, and transmits the collection request. Alternatively, for example, a garbage collector installed on the balcony may detect that the garbage bag 22 is placed and transmit the collection request. The collection request is transmitted together with identification information, position information, and the like of the dwelling unit for specifying the position of the balcony on which the garbage bag 22 should be collected.

In step S602, the control unit 31 acquires the detection results from the sensors 50 of each dwelling unit of the complex housing 13. The control unit 31 transmits a request for the detection results to the sensors 50 via the communication unit 33. In response to the request above, the sensors 50 transmit the detection results to the control device 11 via the relay 51 or the communication instrument 52. The control unit 31 receives the detection results for each dwelling unit via the communication unit 33.

In step S604, the control unit 31 derives the position of the resident and the shielding state of the window and the shielding means for each dwelling unit. For example, the control unit 31 determines the position of the resident in each dwelling unit by detecting the presence of the resident based on the captured image, sound, or temperature distribution in the room of each dwelling unit, and referring to the information on the complex housing 13. Further, the control unit 31 derives the shielding state of the window for each dwelling unit based on the detection result of the open-closed states of the window and the shielding means.

In step S606, the control unit 31 determines a blind spot from the inside in the proximity of the complex housing 13. For example, the control unit 31 assigns an evaluation value to the airspace around the complex housing 13 using the information on the complex housing 13. The airspace around the complex housing 13 is an airspace through which the flying object 12 can pass, and has a volume corresponding to the dimensions and shape of the complex housing 13. The evaluation value indicates the degree of shielding of the line of sight from the inside of each dwelling unit in each airspace. When the evaluation value attached to the airspace satisfies an arbitrary reference value, the control unit 31 determines the airspace as the blind spot.

Here, the airspace around the complex housing 13 and the evaluation value will be described with reference to FIGS. 7A to 7C and FIGS. 8A to 8B.

Figure 7A:
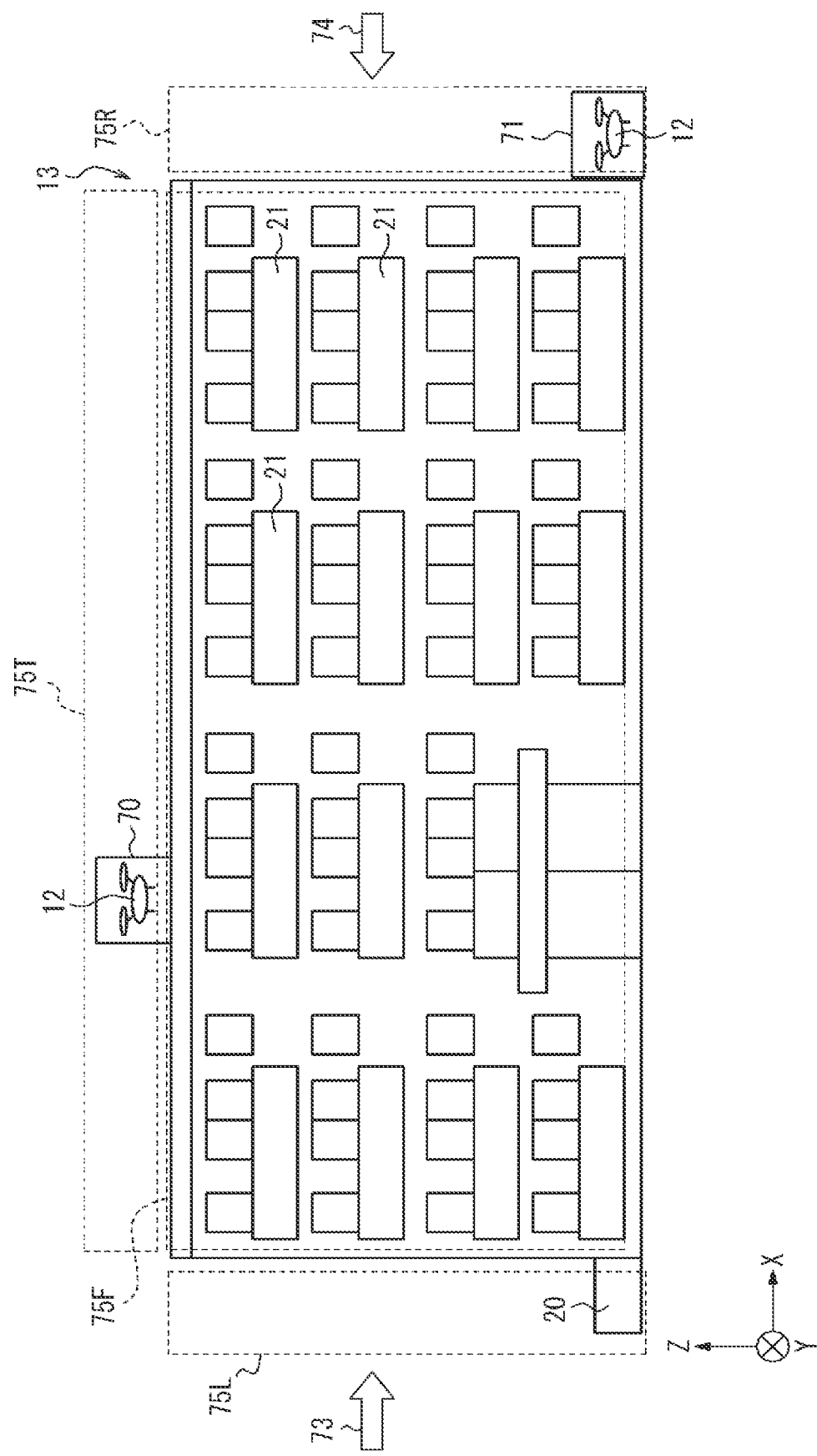
FIG. 7A is a diagram showing an example of an airspace around the complex housing.
Figure 7B:
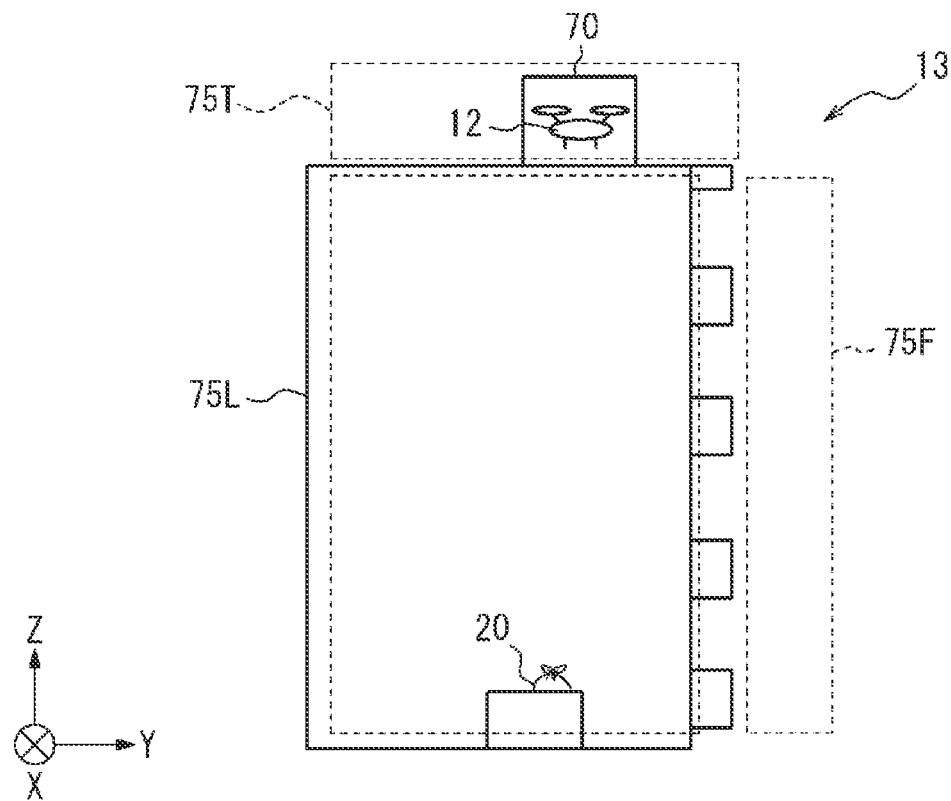
FIG. 7B is a diagram showing an example of the airspace around the complex housing.
Figure 7C:
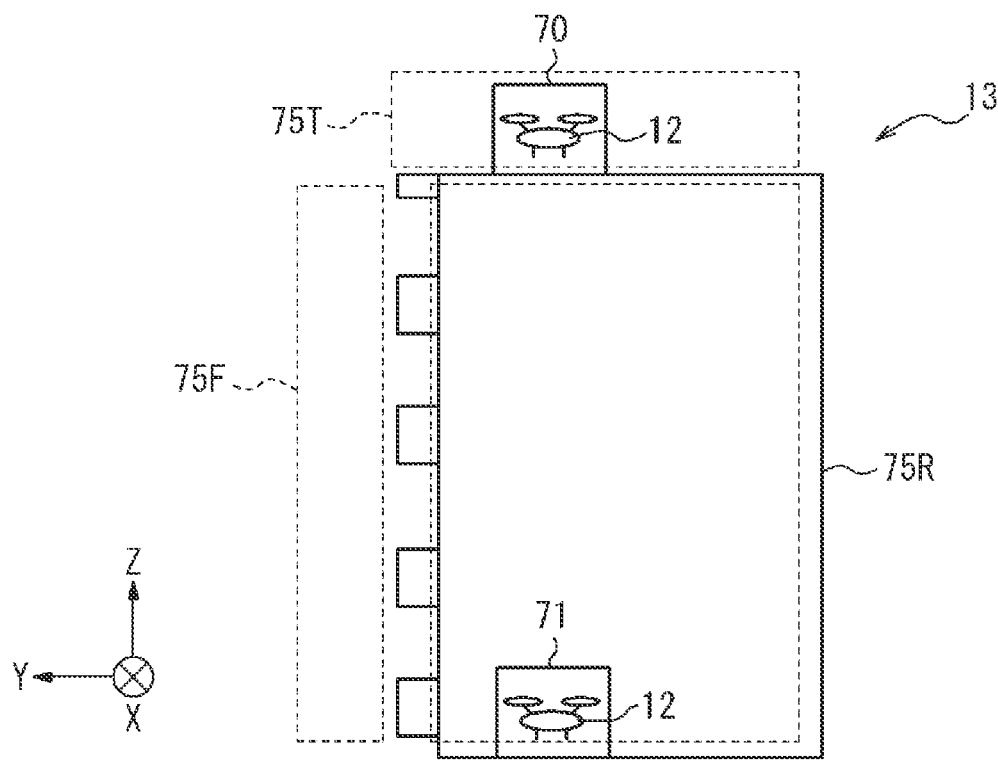
FIG. 7C is a diagram showing an example of the airspace around the complex housing.

FIGS. 7A to 7C schematically show the airspace around the complex housing 13. FIG. 7A is an external view of the front of the complex housing 13. FIG. 7B is an external view of a left side surface 21 of the complex housing 13 in FIG. 7A. FIG. 7C is an external view of a right side surface 74 of the complex housing 13 in FIG. 7A. FIGS. 7A to 7C show an airspace 75T facing the rooftop of the complex housing 13, an airspace 75F facing the front of the complex housing 13, an airspace 75L facing the left side of the complex housing 13, and an airspace 75R facing the right side of the complex housing 13. Each airspace occupies a space of a substantially rectangular parallelepiped and has a volume through which the flying object 12 can pass. The distance (thickness) from the complex housing 13 in each airspace is desirably short (for example, tens to hundreds of centimeters) within a range in which flying safety of the flying object 12 is ensured so as to shorten the flying time of the flying object 12 and save power consumption related to the flying. That is, the flying object 12 flies around the complex housing 13 so as to fly along the surface of the complex housing 13. The three airspaces herein are shown by taking the case where the complex housing 13 exhibits a substantially rectangular parallelepiped shape as an example. However, the shape of the complex housing 13 and the shape and number of airspaces are not limited to the cases shown herein. The shape of the complex housing 13 may be arbitrary, and the shape and number of airspaces facing the outer wall surfaces of the complex housing 13 are conceived in accordance with the shape of the complex housing 13.

When the flying object 12 flies around the complex housing 13, the flying object 12 enters, from one airspace, the other airspace and flies. For example, when the flying object 12 stands by at a standby place 70 on the rooftop, collects the garbage bag on one of the balconies 21 provided in front of the complex housing 13 upon request from the resident, and transports the collected garbage bag to the accumulation area 20 on the left side of the complex housing 13, the flying object 12 flies along a flight route in which the flying object 12 moves in the airspace 75T along an X-Y axis direction and enters the airspace 75F, moves in the airspace 75F along an X-Z axis direction and enters the airspace 75L, and moves in the airspace 75L along a Y-Z axis direction. Further, for example, when the flying object 12 stands by at a standby place 71 on the right side of the complex housing 13, collects the garbage bag on one of the balconies 21 provided in front of the complex housing 13 upon request from the resident, and transports the collected garbage bag to the accumulation area 20 on the left side of the complex housing 13, the flying object 12 flies along a flight route in which the flying object 12 moves in the airspace 75R along the Y-Z axis direction and enters the airspace 75F, moves in the airspace 75F along the X-Z axis direction and enters the airspace 75L, and moves in the airspace 75L along the Y-Z axis direction.

Figure 8A:
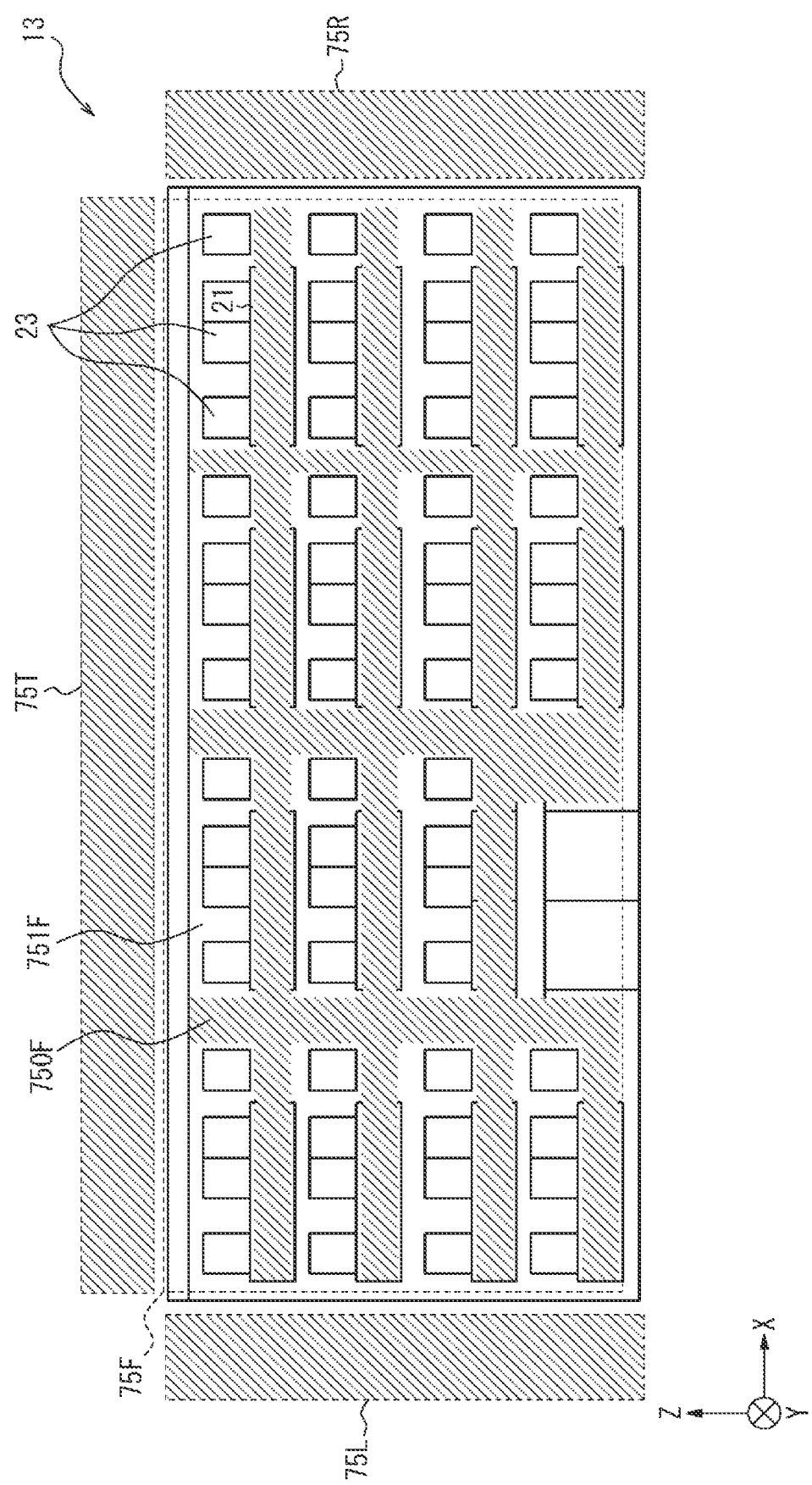
FIG. 8A is a diagram showing an example of a blind spot around the complex housing.

FIG. 8A shows an example of how to assign evaluation values to the airspaces 75T, 75F, 75L, 75R shown in FIGS. 7A to 7C. FIG. 8A shows the airspaces 75T, 75F, 75L, 75R in the front view of the complex housing 13. For example, the control unit 31 assigns a higher evaluation value to an airspace where the line of sight from the inside of each dwelling unit is highly shielded, and a lower evaluation value to an airspace where the line of sight is less shielded. FIG. 8A shows the airspace where the line of sight is shielded by hatching. For example, there are no windows on the rooftop and on the right and left side surfaces of the complex housing 13. Therefore, the line of sight from the inside of the dwelling unit is shielded in the airspaces 75T, 75L, 75R, whereby the evaluation value 1 is assigned to the entire airspace. The balcony 21 of each dwelling unit and the windows 23 such as a sweep window and a waist high window leading to the balcony 21 are provided in front of the complex housing 13. While an airspace 751F outside the windows 23 has a high probability that the line of sight from the inside of the dwelling unit is not shielded, the line of sight from the inside of the dwelling unit is shielded in the airspace outside the handrail wall of the balcony 21, that is, the airspace corresponding to the space from the height of the handrail to the floor surface of the balcony, and an airspace 750F outside the outer wall portion between the dwelling units. Therefore, of the airspace 75F, the airspace (with hatching) 750F in which the line of sight is shielded is assigned the evaluation value 1, and the airspace (without hatching) 751F in which the line of sight is not shielded is assigned the evaluation value −1. For example, the control unit 41 determines that the hatched airspaces 75T, 75L, 75R, 750F to which the evaluation value 1 is assigned are blind spots, with the reference value being 1.

Figure 8B:
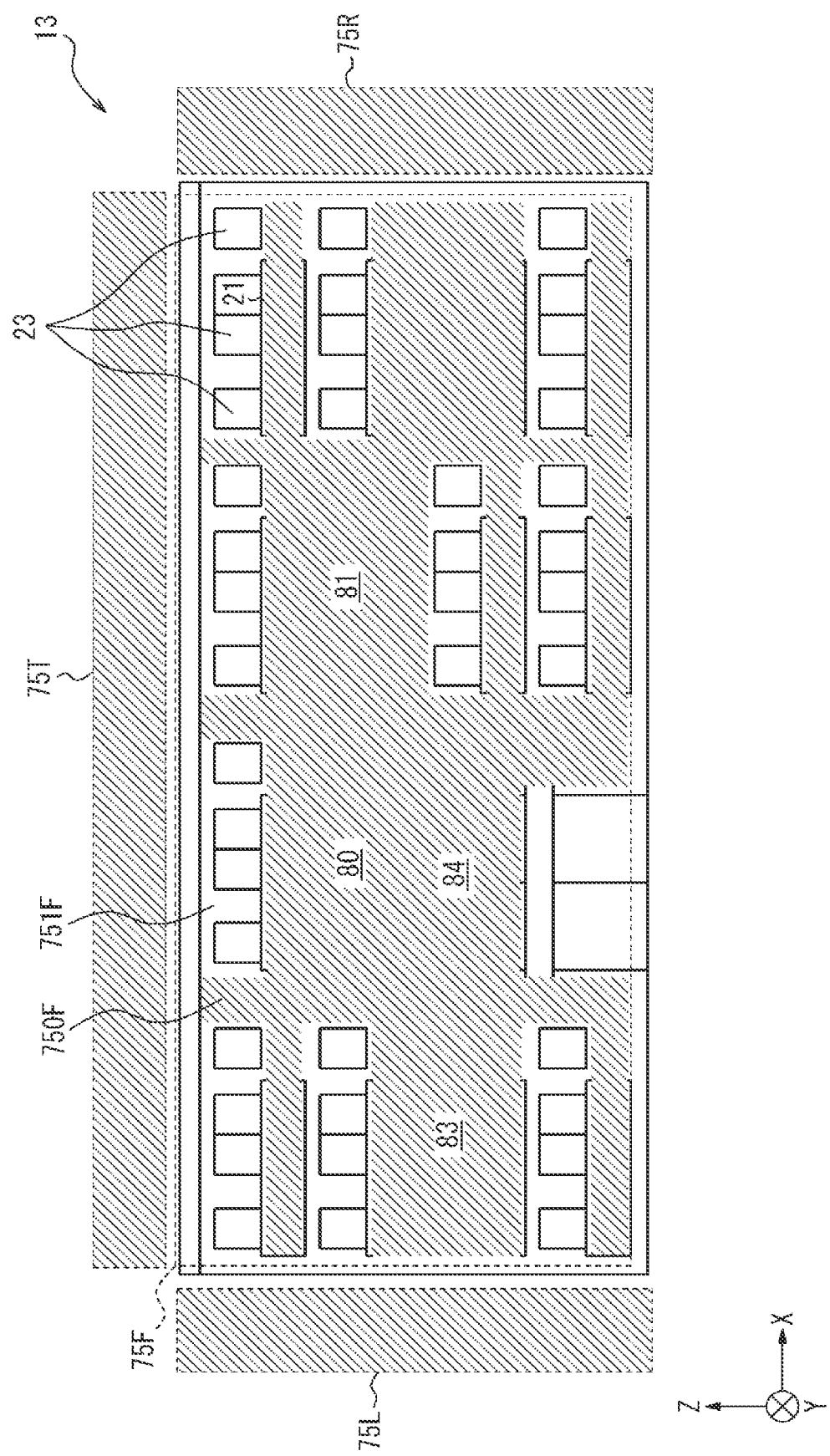
FIG. 8B is a diagram showing an example of the blind spot around the complex housing.

FIG. 8B shows an example of how to assign an evaluation value in the modified example of FIG. 8A. In each dwelling unit, there is no line of sight when no resident is located in the room having the windows 23 and the balcony 21. Therefore, the line of sight from the inside of the dwelling unit is considered to be shielded even in the airspace outside the windows 23. Further, when the windows 23 are shielded by shielding means such as a curtain or a window shade, the line of sight from the inside of the dwelling unit is shielded even in the airspace outside the windows 23. The control unit 31 determines whether the resident is located in the room having the windows 23 and in the balcony 21 for each dwelling unit. Further, the control unit 31 determines whether the windows 23 are shielded based on the open-closed state of the shielding means of the windows 23 for each dwelling unit. Then, the control unit 31 assigns the evaluation value 1 to the dwelling unit that is determined that the resident is not located in the room having the windows 23 and in the balcony 21 or the windows 23 are shielded even when the airspace is an airspace outside the windows 23, because the line of sight is shielded. In addition to the case of FIG. 8A, FIG. 8B shows a case where the line of sight is shielded and the evaluation value 1 is assigned even in the airspace outside the windows 23. Here, for example, the evaluation value 1 is assigned to the airspace outside the windows 23 in dwelling units 80, 81, 83, 85, and the airspace is also determined to be the blind spot.

Returning to FIG. 6, in step S608, the control unit 31 derives the flight route of the flying object 12. The control unit 31 derives the flight route from the standby place of the flying object 12 to the collection place of the garbage bag 22 and the flight route from the collection place of the garbage bag to the accumulation area 20. The control unit 31 derives the flight route based on information indicating the positions of the standby place of the flying object 12, the collection place of garbage, and the accumulation area of garbage in the complex housing 13. Further, the control unit 31 may receive position information from the flying object 12 instead of or in addition to the position of the standby place of the flying object 12 and obtain a start point in the flight route using the position information of the flying object 12. The flight route is a route in which at least the garbage bag 22 held by the flying object 12 enters the blind spot. The flight route may further be a route in which the flying object 12 itself enters, or the flying object 12 and the garbage bag 22 enter, the blind spot.

Figure 9A:
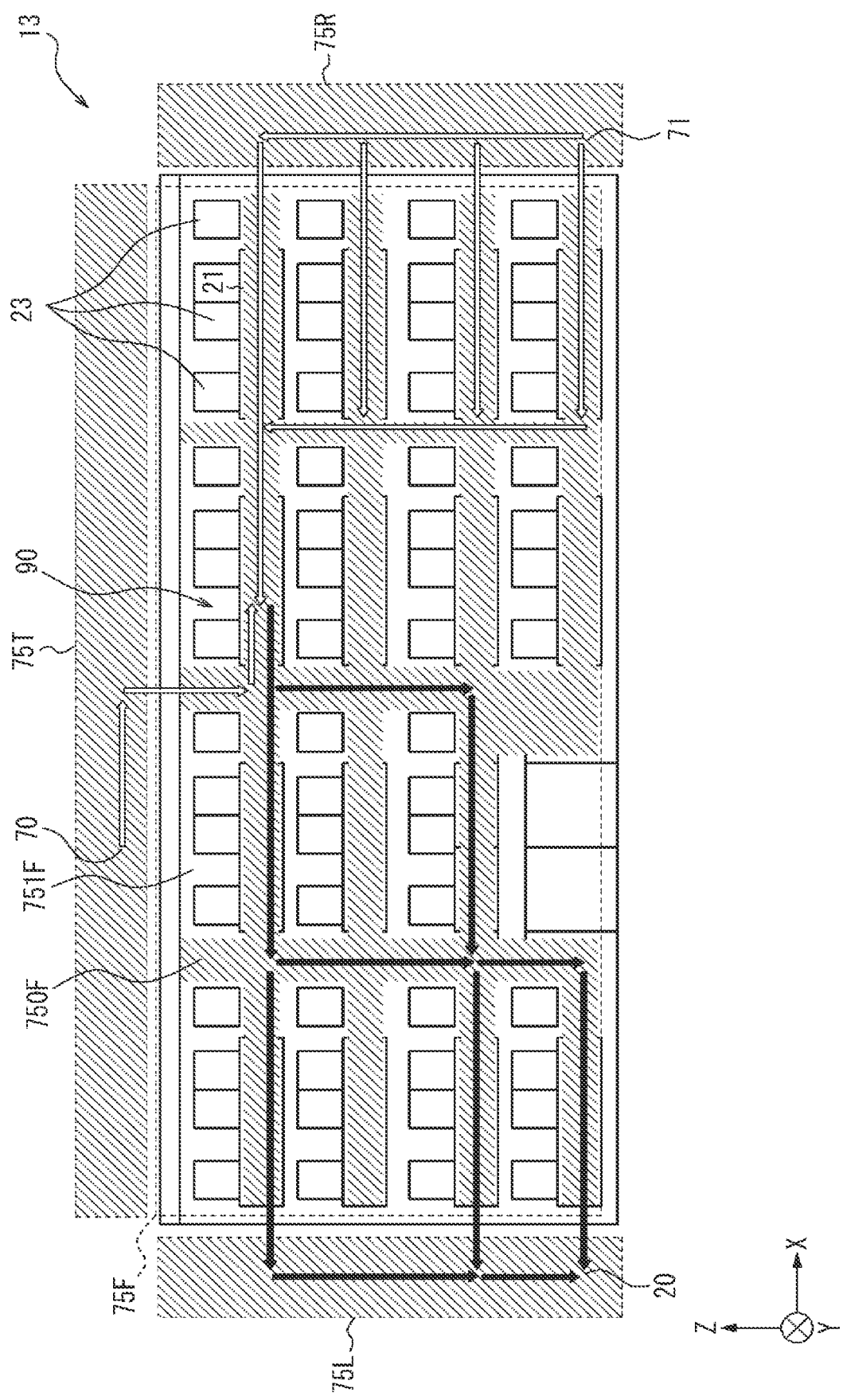
FIG. 9A is a diagram showing an example of flight routes.
Figure 9B:
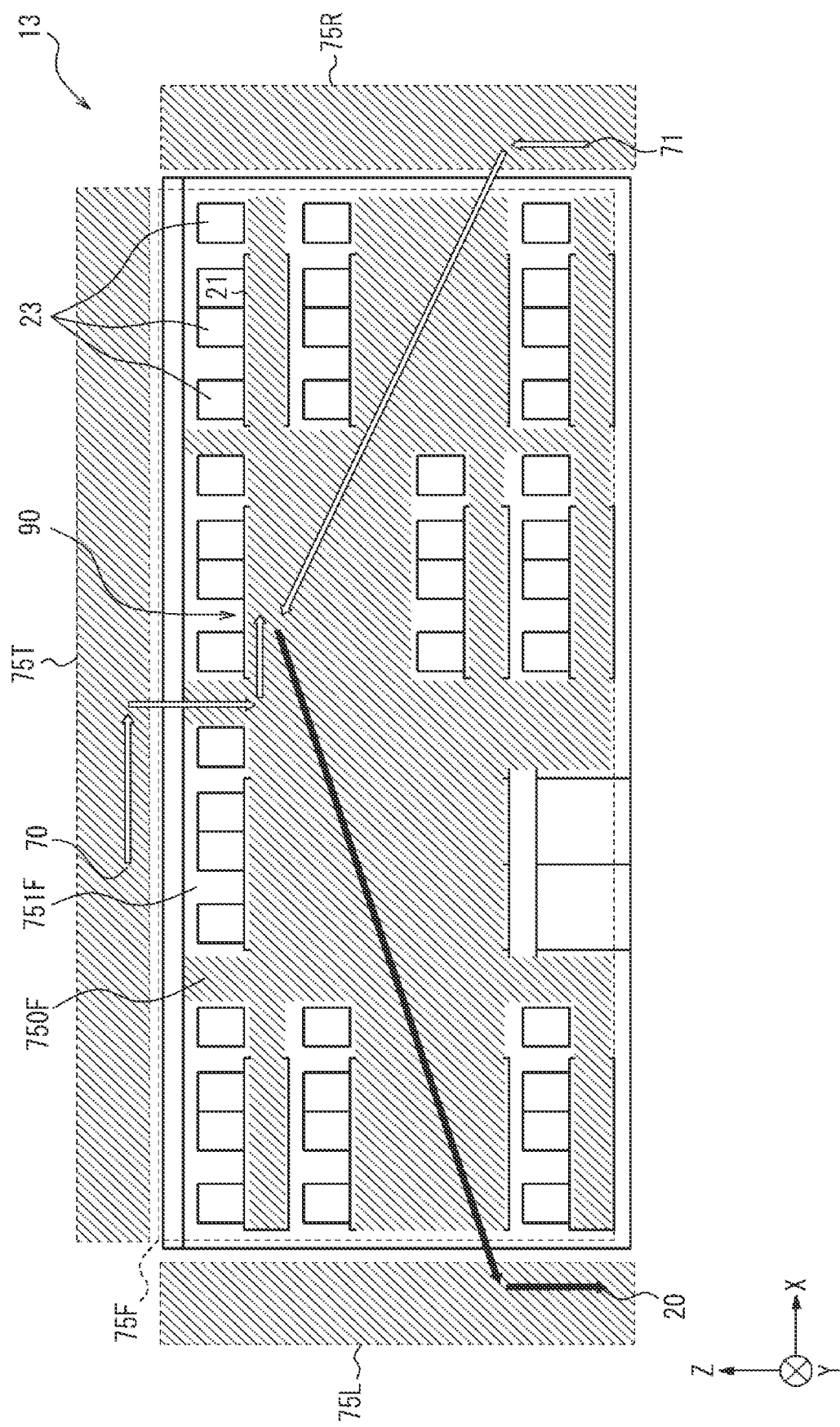
FIG. 9B is a diagram showing an example of the flight routes.

Here, FIGS. 9A and 9B show examples of flight routes.

FIG. 9A schematically shows an example of a flight route passing through the blind spot shown in FIG. 8A. In FIG. 9A, when the flying object 12 collects the garbage bag 22 at the balcony of a dwelling unit 90, white arrows show an example of a route in which the flying object 12 flies to the balcony of the dwelling unit 90 after passing through the blind spot from the standby place 70 on the rooftop or the standby place 17 on the right side, and black arrows show an example of a route in which the flying object 12 flies to the accumulation area 20 on the left side after passing through the blind spot from the balcony of the dwelling unit 90. As described above, when the flying object 12 flies around the complex housing 13, in particular, in the airspace 75F, the flying object 12 passes through the blind spot such that a probability that the line of sight of the resident is obstructed by the flying object 12 itself or the garbage bag 22 held by the flying object 12 can be reduced.

FIG. 9B schematically shows an example of a flight route passing through the blind spot shown in FIG. 8B. In FIG. 9B, when the flying object 12 collects the garbage at the balcony of the dwelling unit 90, white arrows show an example of a route in which the flying object 12 flies to the balcony of the dwelling unit 90 after passing through the blind spot from the standby place 70 on the rooftop or the standby place 17 on the right side, and black arrows show an example of a route in which the flying object 12 flies to the accumulation area 20 on the left side after passing through the blind spot from the balcony of the dwelling unit 90. In particular, FIG. 9B shows an example of a flight route in which the flying object 12 crosses in front of dwelling units of which airspace outside the windows 23 are determined to be blind spots. As shown herein, the flight route can be shortened by adopting the flight route in which the flying object 12 crosses the airspace outside the dwelling units in a diagonal direction. In one example, the control unit 31 obtains the shortest flight route on condition that the garbage bag 22 enters the blind spot. Therefore, it is possible to improve an efficiency of collecting operation by the flying object 12 and suppress power consumption required for the flight.

The control unit 31 can determine the flight route using an arbitrary route search algorithm. For example, the airspace that can be passed or a part thereof may be selected as an option, and the shortest route may be obtained from possible combinations of the airspaces, or the physically shortest route between two points to be moved may be obtained and a partial detour route may be obtained when the route passes through the airspace that is not a blind spot. Alternatively, the control unit 31 may determine the flight route in a manner such that the control unit 31 has information in which the flight route is associated in advance with the blind spot pattern for each complex housing 13 and selects the flight route in accordance with the blind spot pattern.

Returning to FIG. 6, in step S610, the control unit 31 transmits the flight route information to the flying object 12 using the communication unit 33. The flight route information includes the movement distance, movement direction, altitude, coordinates, distance from the complex housing 13, and the like required when the flying object 12 flies around the complex housing 13 by autopilot.

When the control unit 41 of the flying object 12 receives the flight route information via the communication unit 43, the control unit 41 executes a control process for causing the flying object 12 to fly along the flight route so as to cause the flying object 12 to collect the garbage bag 22. When the flying object 12 arrives at the balcony 21 that is the collection place, for example, the flying object 12 holds and transports the garbage bag 22 using a pair of arms to interpose the garbage bag 22 therebetween. The flying object 12 then continues the flight toward the accumulation area 20. When the flying object 12 transports the garbage bag 22 to the accumulation area 20, the arms are opened and the garbage bag 22 is dropped into the accumulation area. The flying object 12 then flies to the standby place along an arbitrary flight route and stands by for the next collection request.

The control device 11 may execute the procedure shown in FIG. 6 once when the flying object 12 starts the flight, or may periodically execute the procedure shown in FIG. 6 even after the flying object 12 starts the flight. For example, the control device 11 may receive the position information of the flying object 12 from the flying object 12 at a cycle of several seconds, derive the flight route from the current position of the flying object 12 to the destination at that time, and transmit information on the updated flight route to the flying object 12. Even when the position of the resident and the shielding state of the windows change after the flying object 12 starts flying and therefore the blind spot changes, the control device 11 can issue an instruction on the optimum flight route to the flying object 12 at any time. Therefore, it is possible to further reduce the time and power consumption.

Further, when the flying object 12 completes one time of garbage collection and transportation, the flying object 12 may collect the next garbage without returning to the standby place. In that case, the control device 11 obtains the flight route from the current position of the flying object 12 to the position of the balcony for the next collection and transmits the information on the flight route to the flying object 12.

In the above example, the case where the flight route in which the garbage bag 22 enters the blind spot in the airspace 75F facing the front of the complex housing 13 is derived has been described. However, when the window 23 is provided on the other side surface of the complex housing 13, also in an airspace facing the other side surface, the control unit 41 of the control device 11 executes the determination process of the blind spot and the derivation process of the flight route, similar to the above.

In the above example, the case where the binary evaluation values 1, −1 are assigned to two cases where the line of sight from the inside of the complex housing 13 is shielded and where the line of sight is not shielded has been described. However, evaluation values subdivided into three or more stages may be assigned to the airspaces in accordance with the degrees of shielding of the line of sight. For example, when a fence or a grid shape handrail is provided instead of the handrail wall of the balcony, the airspace outside such handrail is not as shielded as the handrail wall. Therefore, for example, an intermediate evaluation value 0 may be assigned to those handrails. Further, for example, in the case where a plurality of curtains having different shielding properties, such as a drape curtain and a lace curtain, are provided on the window 23 and the open-closed state of each of the curtains is detected by a sensor, when only the curtain having a low shielding property is closed, the airspace outside the window 23 is not as shielded as when the curtain with high shielding property is closed. Therefore, the intermediate evaluation value 0 may be assigned to the case. Further, an intermediate evaluation value may be assigned in accordance with the angle of the blades of the window shade and the degree of shielding of the line of sight corresponding to the amount of expansion of the screen. Alternatively, even in the case where the shielding means is open, when the glass of the sash of the window 23 is frosted and the sash of the window 23 is closed, an intermediate evaluation value may be assigned to the airspace outside the window 23. In the case where the evaluation values of three or more stages are assigned to the airspaces, the control unit 41 of the control device 11 can determine, for example, that the airspace is a blind spot when the evaluation value assigned to the airspace satisfies a reference value (for example, 0) that is arbitrarily determined. Note that, the examples of the evaluation values and the reference values are not limited to the values shown here, and may be arbitrary. Determination of the blind spot based on the evaluation values of a plurality of stages makes it possible to cause the flying object 12 to fly along the flight route in which the lines of sight of the residents are less likely obstructed in accordance with the state of the complex housing 13. Therefore, it is possible to improve the comfort of the residents.

The present disclosure is not limited to the embodiments described above. For example, two or more blocks shown in the block diagram may be integrated, or a single block may be divided. Instead of executing two or more steps shown in the flowcharts in chronological order according to the description, the steps may be executed in parallel or in a different order, depending on the processing capacities of the devices that execute the steps, or as necessary. Other changes may be made without departing from the scope of the present disclosure.

For example, the control device 11 may be provided in the flying object 12. In that case, a part of the operation of the flying object 12 may be performed by the control device 11. When the control unit 41, the storage unit 42, the communication unit 43, the input unit 44, the output unit 45, and the positioning unit 46 of the flying object 12 are incorporated in the control instrument, the control instrument may be integrated in the control device 11. Further, the present embodiment also includes a case of a housing on a scale in which a plurality of rooms having windows and balconies are accommodated and a resident resides in each room, instead of the complex housing 13.

What is claimed is:

1. A control device comprising:
a communication unit; and
at least one processor that transmits and receives information via the communication unit, wherein when a flying object flies around a housing, the at least one processor transmits information on a flight path to the flying object based on information on the housing, wherein, in the flight path, a transported object of the flying object remains in a blind spot from inside of the housing, and the flight path is a shortest route for the flying object to transport the transported object in a diagonal direction from one balcony of the housing to an accumulation area of the transported object, wherein:
when determining the information on the flight path, the at least one processor receives information indicative of a shielding state of a window of a dwelling unit of the housing, and determines the window as the blind spot in a case where an evaluation value satisfies a reference value, the evaluation value corresponding to a plurality of levels of shielding of the window and subdivided into three or more stages, and
the flying object stands by at a standby place on a rooftop, collects a garbage bag on the one balcony of the housing upon request from a resident, and transports the collected garbage bag to the accumulation area of the housing.

2. The control device according to claim 1, wherein the at least one processor determines the blind spot based on information indicating a position of the resident in the dwelling unit in the housing.

3. The control device according to claim 2, wherein the at least one processor determines outside of a handrail wall of the one balcony of the dwelling unit as the blind spot.

4. The control device according to claim 2, wherein when the resident is not located in a room provided with the window and the one balcony provided outside the window in the dwelling unit, the at least one processor determines outside of the window as the blind spot.

5. The control device according to claim 2, wherein the at least one processor receives the information indicating the position of the resident from a first sensor provided in the housing or a second sensor carried by the resident.

6. The control device according to claim 1, further comprising one or more circuits communicatively coupled to the at least one processor that stores a program that when executed by the at least one processor causes the operation of the control device.

7. A circuit that causes the flying object to fly along the flight path based on information on the flight path received from the control device according to claim 1.

8. A flying object that flies under control of the circuit according to claim 7.

9. A sensor that transmits information on the position of the resident in the dwelling unit of the housing to the control device according to claim 2.

10. A method of operating a system including a flying object and a control device that transmits and receives information to and from the flying object, wherein when the flying object flies around a housing, the control device transmits information on a flight route path to the flying object based on information on the housing, wherein, in the flight path, a transported object of the flying object remains in a blind spot from inside of the housing, and the flight path is a shortest route for the flying object to transport the transported object in a diagonal direction from one balcony of the housing to an accumulation area of the transported object, wherein:
when determining the information on the flight path, the control device receives information indicative of a shielding state of a window of a dwelling unit of the housing, and determines the window as the blind spot in a case where an evaluation value satisfies a reference value, the evaluation value corresponding to a plurality of levels of shielding of the window and subdivided into three or more stages, and
the flying object stands by at a standby place on a rooftop, collects a garbage bag on the one balcony of the housing upon request from a resident, and transports the collected garbage bag to the accumulation area of the housing.

11. The method according to claim 10, wherein the control device determines the blind spot based on information indicating a position of the resident in the dwelling unit in the housing.

12. The method according to claim 11, wherein the control device determines outside of a handrail wall of the one balcony of the dwelling unit as the blind spot.

13. The method according to claim 11, wherein when the resident is not located in a room provided with the window and the one balcony provided outside the window in the dwelling unit, the control device determines outside of the window as the blind spot.

14. The method according to claim 11, wherein the control device receives the information indicating the position of the resident from a first sensor provided in the housing or a second sensor carried by the resident.

15. The control device of claim 1, wherein the transported object of the flying object enters the blind spot from the inside of the housing in preference to the flying object.

16. The control device of claim 1, wherein the flying object flies to the accumulation area of garbage located outside the housing, and wherein the transported object is the garbage bag.

17. The control device of claim 1, wherein the at least one processor receives position information of the flying object from the flying object at a cycle of several seconds, derives the flight path from a current position of the flying object to a destination at that time, and transmits information on an updated flight path to the flying object.

18. The method according to claim 10, wherein the control device receives position information of the flying object from the flying object at a cycle of several seconds, derives the flight path from a current position of the flying object to a destination at that time, and transmits information on an updated flight path to the flying object.

* * * * *